(12) United States Patent
Chen (10) Patent No.: US 8,077,760 B2
(45) Date of Patent: Dec. 13, 2011

(54) DIGITAL TRANSPONDER WITH REAL SIGNAL CHANNELIZER AND SYNTHESIZER

(75) Inventor: Weiguo Chen, Cambridge (CA)

(73) Assignee: COM DEV International Ltd., Cambridge (CA)

( * ) Notice: Subject to any disclaimer, the term of this patent is extended or adjusted under 35 U.S.C. 154(b) by 569 days.

(21) Appl. No.: 12/266,158

(22) Filed: Nov. 6, 2008

(65) Prior Publication Data

US 2010/0109928 A1    May 6, 2010

(51) Int. Cl.
 *H04L 25/20*    (2006.01)
(52) U.S. Cl. ......................................... 375/211; 375/260
(58) Field of Classification Search .................. 375/211; 341/126, 155, 157, 144
See application file for complete search history.

(56) References Cited

U.S. PATENT DOCUMENTS

| | | | |
|---|---|---|---|
| 5,274,627 A | 12/1993 | De Santis | |
| 5,535,240 A | 7/1996 | Carney et al. | |
| 5,790,529 A * | 8/1998 | Haber | 370/536 |
| 5,852,629 A * | 12/1998 | Iwamatsu | 375/211 |
| 6,317,583 B1 * | 11/2001 | Wolcott et al. | 455/12.1 |
| 6,356,569 B1 | 3/2002 | Sonalkar et al. | |
| 6,574,794 B1 | 6/2003 | Sarraf | |
| 6,662,367 B2 | 12/2003 | Dapper et al. | |
| 7,024,158 B2 | 4/2006 | Wiswell | |
| 7,043,203 B2 * | 5/2006 | Miquel et al. | 455/24 |
| 7,095,781 B1 | 8/2006 | Hsu et al. | |
| 7,145,972 B2 | 12/2006 | Kumar et al. | |
| 2004/0185775 A1 | 9/2004 | Bell | |
| 2004/0246994 A1 | 12/2004 | Munoz et al. | |

FOREIGN PATENT DOCUMENTS

EP    0 668 666    8/1995

OTHER PUBLICATIONS

European Search Report dated Aug. 13, 2009.
European Communication (Notice of Allowance) under Rule 71(3) EPC dated Jun. 30, 2010 for Application No. 09 156513.5-2411.

* cited by examiner

*Primary Examiner* — Khanh C Tran
*Assistant Examiner* — David Huang
(74) *Attorney, Agent, or Firm* — Bereskin & Parr LLP; Isis E. Caulder (57) ABSTRACT

Embodiments disclosed herein relate generally to digital transponders. In one broad aspect, there is provided a digital transponder comprising: (a) an analog to digital converter configured to receive a real analog wideband multi-carrier signal and generate a real digital wideband multi-carrier signal from the real analog wideband multi-carrier signal, the real analog wideband multi-carrier signal spans M element channels, M being an integer greater than or equal to one; (b) a channelizer configured to channelize the real digital wideband multi-carrier signal into 2M channelized digital signals, the 2M channelized digital signals comprising M pairs of channelized digital signals, each pair of channelized digital signals comprising a primary channelized digital signal and a secondary channelized digital signal, the secondary channelized digital signal being an image of the primary channelized digital signal; (c) a switch matrix and signal construction module configured to generate a plurality of intermediate signals from only the primary channelized digital signals, the plurality of intermediate signals comprising pairs of intermediate signals, each pair comprising a primary intermediate signal and a secondary intermediate signal, the secondary intermediate signal being an image of the primary intermediate signal; (d) at least one synthesizer, the at least one synthesizer configured to combine at least one pair of intermediate signals to generate a real digital output signal; and (e) at least one digital to analog converter, the at least one digital to analog converter configured to convert the real digital output signal to an analog output signal.

22 Claims, 8 Drawing Sheets

DIGITAL TRANSPONDER WITH REAL SIGNAL CHANNELIZER AND SYNTHESIZER

FIELD

The described embodiments relate to the field of digital transponders. More particularly, the described embodiments relate to digital transponders which utilize channelizers and synthesizers where the input to the channelizers and the output of the synthesizers are in real format.

BACKGROUND

Transponders used in communication systems, such as satellite communication systems, tend to receive an incoming signal at a particular frequency and retransmit all or portions of the signal at a different frequency. Simple transponders can be thought of as repeaters since they typically receive an incoming signal and retransmit the entire received signal at a different frequency. More sophisticated transponders, however, may have the ability to break the received signal into multiple frequency bands or channels and then reconfigure the frequency bands or channels prior to retransmission.

Typically the more sophisticated digital transponders include five components: a digitizer module, a channelizer module, a switch module, a recombiner module and a digital to analog conversion module. The digitizer module digitizes the received analog signal, the channelizer divides the received signal into multiple channels, the switch module reconfigures the channels, the recombiner module combines the reconfigured channels to form one or more digital output signals, and the digital to analog conversion module converts the digital output signals into analog output signals.

Typically the channelizer module and the recombiner module are implemented as polyphase filter-based signal processors. These polyphase filter-based signal processors typically work with signals in complex format (in-phase and quadrature components separately) to minimize the dimensions of the polyphase filter banks. However, dealing with signals in complex format increases the number of conversion modules required and increases the complexity of the interfaces. This is particularly true with respect to the input and output ports of the digital processors.

SUMMARY

Embodiments disclosed herein relate generally to digital transponders and methods of converting at least one input wideband multi-carrier signal into at least one analog output wideband multi-carrier signal using the digital transponder.

In one broad aspect, there is provided a digital transponder comprising: (a) an analog to digital converter configured to receive a real analog wideband multi-carrier signal and generate a real digital wideband multi-carrier signal from the real analog wideband multi-carrier signal, the real analog wideband multi-carrier signal comprising M channels, M being an integer greater than or equal to one; (b) a channelizer configured to channelize the real digital wideband multi-carrier signal into 2M channelized digital signals, the 2M channelized digital signals comprising M pairs of channelized digital signals, each pair of channelized digital signals comprising a primary channelized digital signal and a secondary channelized digital signal, the secondary channelized digital signal being an image of the primary channelized digital signal; (c) a switch matrix and signal construction module configured to generate a plurality of intermediate signals from only the primary channelized digital signals, the plurality of intermediate signals comprising pairs of intermediate signals, each pair comprising a primary intermediate signal and a secondary intermediate signal, the secondary intermediate signal being an image of the primary intermediate signal; (d) at least one synthesizer, the at least one synthesizer configured to combine at least one pair of intermediate signals to generate a real digital output signal; and (e) at least one digital to analog converter, the at least one digital to analog converter configured to convert the real digital output signal to an analog output signal.

In another broad aspect, there is provided a method of converting at least one input wideband multi-carrier signal into at least one analog output wideband multi-carrier signal, the method comprising: (a) receiving the input wideband multi-carrier signal, the input wideband signal being a real analog signal and comprising M channels, M being an integer greater than or equal to one; (b) digitizing the input wideband multi-carrier signal to produce a real digital input wideband multi-carrier signal; (c) channelizing the real digital wideband multi-carrier signal into 2M separate channelized digital signals, the 2M channelized digital signals comprising M pairs of channelized digital signals, each pair of channelized digital signals comprising a primary channelized digital signal and a secondary channelized digital signal, the secondary channelized digital signal being an image of the primary channelized digital signal; (d) generating a plurality of intermediate signals from only the primary channelized digital signals, the plurality of intermediate signals comprising pairs of intermediate signals, each pair comprising a primary intermediate signal and a secondary intermediate signal, the secondary intermediate signal being an image of the primary intermediate signal; (e) synthesizing at least one pair of intermediate signals to generate at least one real digital output signal; and (f) converting the at least one real digital output signal to the at least one real analog output signal.

BRIEF DESCRIPTION OF THE DRAWINGS

For a better understanding of embodiments of the systems and methods described herein, and to show more clearly how they may be carried into effect, reference will be made, by way of example, to the accompanying drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1:
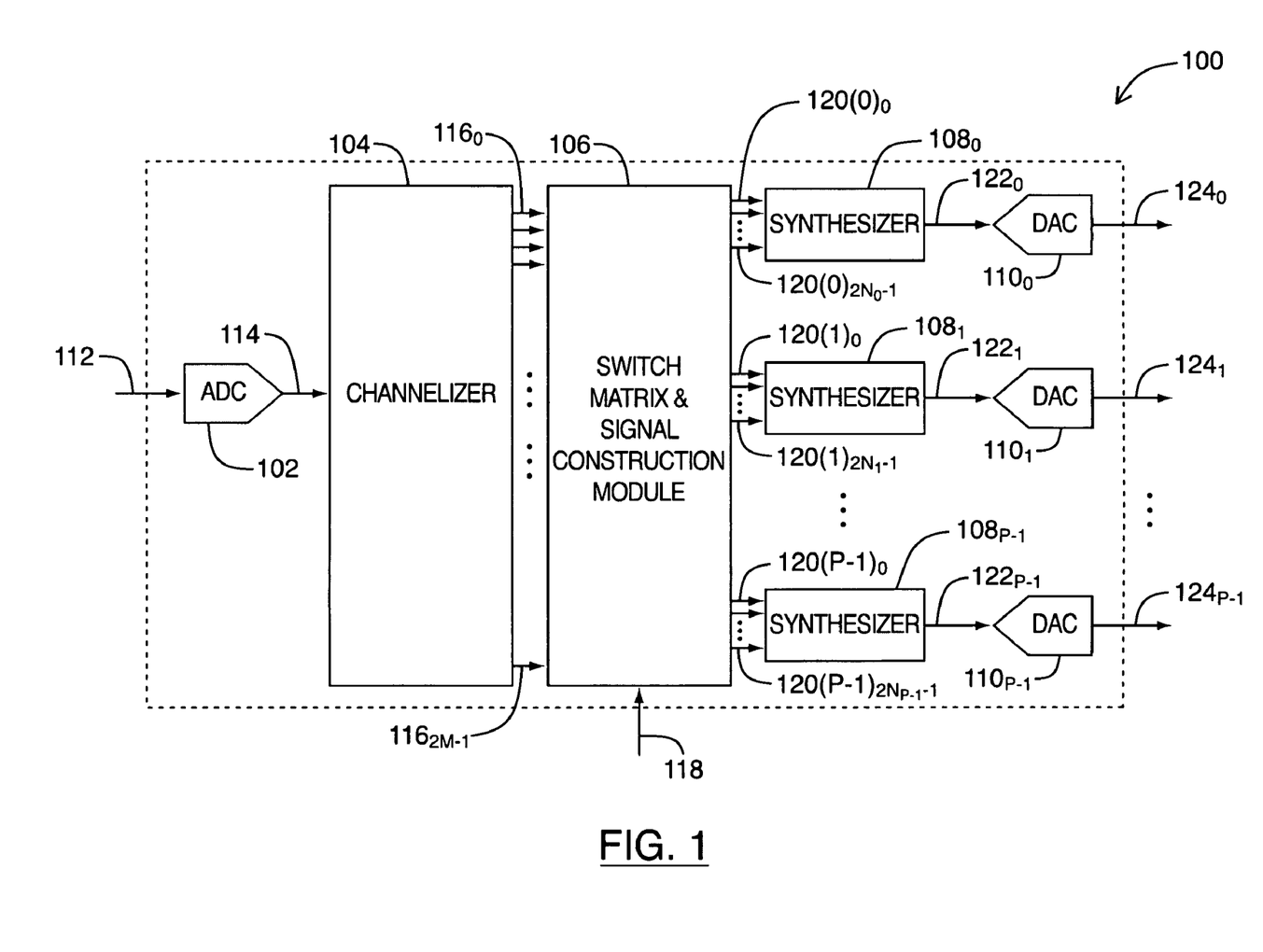
FIG. 1 is a block diagram of a transponder in accordance with at least one embodiment.

Reference is now made to FIG. 1, in which a digital transponder 100 in accordance with an embodiment is illustrated. The digital transponder 100 receives a real analog wideband multi-carrier signal 112 with one or more frequency bands or channels, and generates one or more analog output signals $124_0$ to $124_{P-1}$. Each analog output signal $124_0$ to $124_{P-1}$ is centered at a predetermined intermediate frequency (IF), and includes at least a portion of the frequency bands or channels of the real analog wideband multi-carrier signal 112. Typically, the predetermined intermediate frequencies of the analog output signals $124_0$ to $124_{P-1}$ are distinct from the intermediate frequency of the real analog wideband multi-carrier signal 112.

In the embodiment shown in FIG. 1, the transponder 100 includes an analog to digital converter (ADC) 102, a channelizer 104, a switch matrix and signal construction (SM & SC) module 106, one or more synthesizers $108_0$ to $108_{P-1}$ and one or more digital to analog converters (DACs) $110_0$ to $110_{P-1}$. Typically the transponder 100 includes one synthesizer 108 and one DAC 110 for each analog output signal 124 generated by the transponder 100. The letter P will be generally used to denote the number of analog output signals 124 generated by the transponder 100. Note that while in some embodiments, such as that shown in FIG. 1, the transponder 100 includes more than one synthesizer 108 and more than one DAC 110, where the transponder 100 produces only one analog output signal 124, the transponder 100 may only include a single synthesizer 108 and a single DAC 110.

Each of the ADC 102, the channelizer 104, the SM & SC module 106, the synthesizers 108 and the DACs 110 may be implemented in hardware, firmware (i.e. a field programmable gate array (FPGA) or the like), or in software (i.e. via a processor or the like), but they do not all need to be implemented in the same manner. Accordingly, some may be implemented in hardware where others may be implemented in firmware or software.

The ADC 102 receives the real analog wideband multi-carrier signal 112 comprising M frequency bands or channels where M is an integer greater than or equal to 1. Each of the M frequency bands or channels has the same bandwidth, $B_c$, referred to as the element channel bandwidth. While the frequency bands can be designed to carry one or more narrow band signals, certain wideband signals may occupy multiple frequency bands. Accordingly, the real analog wideband multi-carrier signal 112 may be comprised of a plurality of signals with varying bandwidths. For example, say M is equal to six, such that the real analog wideband multi-carrier signal 112 is comprised of six frequency bands numbered 0 to 5. Band 0 may represent a single signal with a bandwidth $B_c$, bands 1 and 2 may together represent a wider band signal with a bandwidth $2B_c$, and bands 3, 4 and 5 may together represent and even wider band signal with a bandwidth $3B_c$.

The real analog wideband multi-carrier signal 112 may be a version of a radio frequency (RF) signal received by an antenna that has been down converted to a low intermediate frequency (IF). Anti-aliasing filtering may also be performed on the real analog wideband multi-carrier signal 112 prior to being sent to the ADC 102. The ADC 102 digitizes the received real analog wideband multi-carrier signal 112, and outputs a real digital wideband multi-carrier signal 114. The ADC 102 operates at a sampling frequency, $f_s$, which according to Nyquist's theory must be at least two times the bandwidth, $B_{wb}$, of the real analog wideband multi-carrier signal 112.

Figure 2:
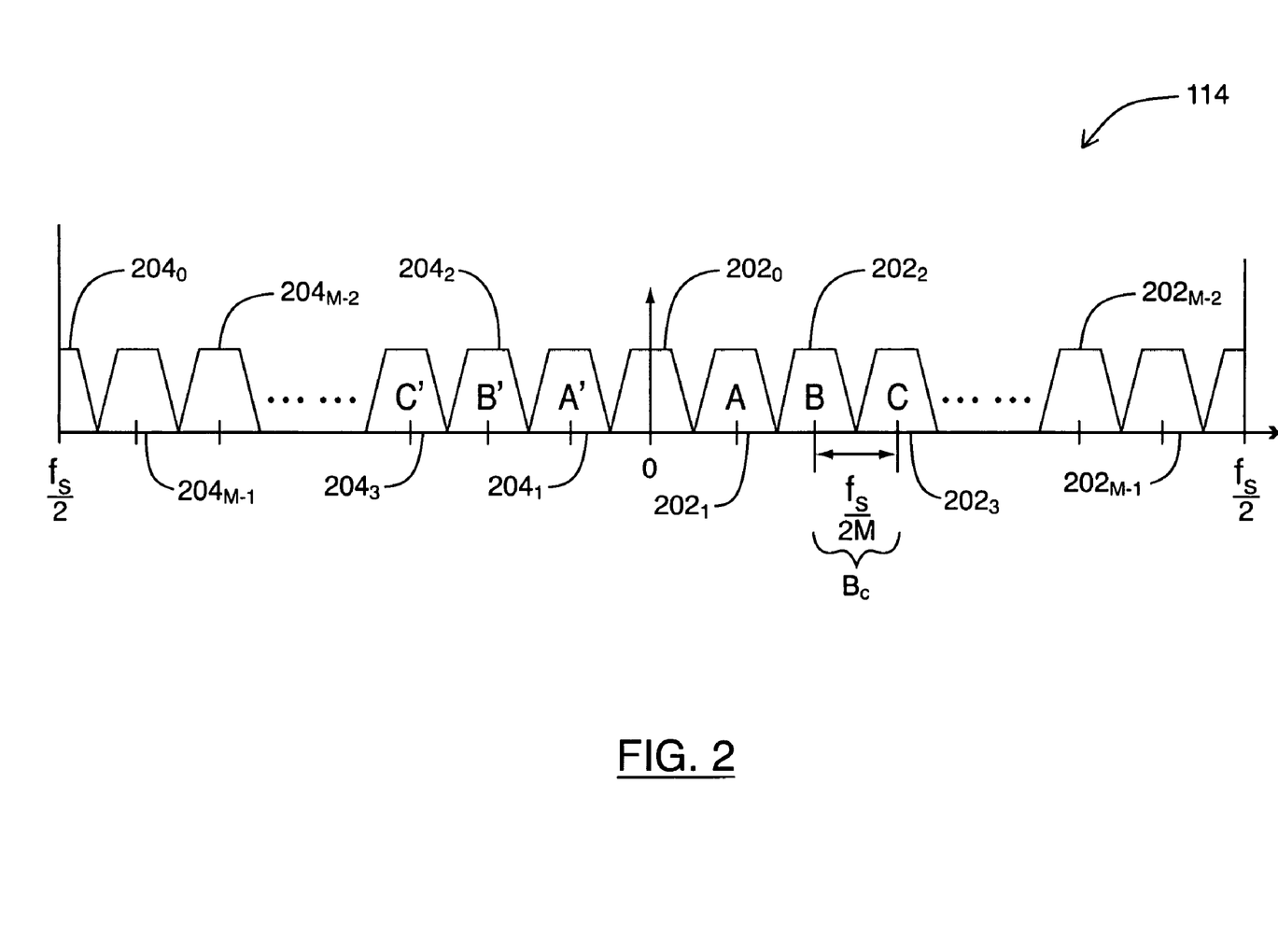
FIG. 2 is a graph illustrating the frequency characteristics of the output of the ADC of FIG. 1 in accordance with at least one embodiment.

Reference is now made to FIG. 2, in which the frequency domain characteristics of the real digital wideband multi-carrier signal 114 are illustrated. It can be seen from FIG. 2 that the real digital wideband multi-carrier signal 114 has symmetric frequency domain characteristics. Specifically, the real digital wideband multi-carrier signal 114 can be divided into 2M frequency bands or channels $202_0$ to $202_{M-1}$ and $204_0$ to $204_{M-1}$ where the second block of channels $204_0$ to $204_{M-1}$ are the images of the first block of channels $202_0$ to $202_w$. For example, if channel $202_1$ has a center frequency of $f_1$, then channel $204_1$ is a mirror image of channel $202_1$ centered at frequency $f_1$. Each channel $202_0$ to $202_{M-1}$ and $204_0$ to $204_{M-1}$ of the digital wideband multi-carrier signal 114 has the same bandwidth, $B_c$. The element channel bandwidth, $B_c$, is related to the ADC 102 sampling frequency, $f_s$, by the ratio $f_s/2M$. Factors that may be considered in choosing the element channel bandwidth, $B_c$, include the system needs, the last intermediate frequency of the digital output signals 122, the bandwidth configuration step size of the digital output signals 122, and the ADC 102 and digital processor speeds.

Referring back to FIG. 1, the channelizer 104 receives the real digital wideband multi-carrier signal 114 from the ADC 102 and extracts the 2M channels $202_0$ to $202_{M-1}$ and $204_0$ to $204_{M-1}$ from the real digital wideband multi-carrier signal 114 and down converts them to baseband. The extracted and down converted channels are output as channelized digital signals $116_0$ to $116_{M-1}$. The first block of channelized digital signals $116_0$ to $116_{M-1}$, hereafter referred to as the primary channelized digital signals, correspond to the first block of channels $202_0$ to $202_{M-1}$ of the real digital wideband multi-carrier signal 114, and the second block of channelized digital signals $116_{M-1}$ to $116_{M-1}$, hereafter referred to as the secondary channelized digital signals, correspond to the second block of channels $204_1$ to $204_{M-1}$ and $204_0$ of the real digital wideband multi-carrier signal 114 respectively. The relationship between the channelized digital signals and the channels of the real digital wideband multi-carrier signal is shown in Table 1. As noted above, channels $204_0$ to $204_{M-1}$ are the images of channels $202_0$ to $202_{M-1}$ thus the secondary channelized digital signals $116_{M-1}$ and $116_{M-1}$ to $116_{M+1}$ are the images of the primary channelized digital signals $116_0$ to $116_{M-1}$. Since the channelizer 104 not only divides the real digital wideband multi-carrier signal 114 into its M channels, but it also divides each channel into its in-phase and quadrature components, the channelizer 104 functions as both a channelizer and an I/Q demodulator.

TABLE 1

| Channelized Digital Signal | Signals of the real digital wideband multi-carrier signal |
|---|---|
| $116_0$ | $202_0$ |
| $116_1$ | $202_1$ |
| ... | ... |
| $116_{M-2}$ | $202_{M-2}$ |
| $116_{M-1}$ | $202_{M-1}$ |
| $116_M$ | $204_0$ |
| $116_{M+1}$ | $204_{M-1}$ |
| $116_{M+2}$ | $204_{M-2}$ |
| ... | ... |
| $116_{2M-2}$ | $204_2$ |
| $116_{2M-2}$ | $204_1$ |

By performing both channelizer and I/Q demodulation functions the channelizer 104 offers significant advantages over known channelizers which typically require the I/Q demodulation to occur prior to channelization. For example, in a typical transponder system an analog signal is received by an analog quadrature demodulator which divides the analog signal into two analog signals—its in-phase component and its quadrature component. Each component or signal is then sent to a separate analog to digital converter (ADC) where it is digitized. The two digitized signals (the in-phase and quadrature signals) are then sent to a channelizer. By inputting a real signal into the channelizer 104 as shown in FIG. 1 the channelizer 104 performs both channelization and I/Q demodulation. This eliminates the need for a separate I/Q demodulator and the second ADC which reduces the power consumption and complexity of the transponder. Furthermore, by eliminating the analog quadrature demodulator, the I/Q imbalances typically associated with analog quadrature demodulators are also eliminated.

However, where the channelizer 104 is implemented as a polyphase FFT (Fast Fourier Transform) filter bank analyzer, inputting a real signal into the channelizer 104 will double the number of points of the FFT processor compared to inputting a signal in complex format (in-phase and quadrature signals) to the channelizer. For example, an M-channel input signal in real formal requires a 2M-point FFT channelizer, whereas an M-channel input signal in complex format requires only an M-point FFT channelizer. Although the number of points of the FFT processor is doubled in the real-input case compared to the complex-input case, there are certain benefits to inputting a real signal into the channelizer 104. For example, in the real-input case the channelizer 104 (and by extension the polyphase filters of the polyphase FFT filter bank analyzer) will only have to process one signal as opposed to two in the complex-input case.

An exemplary embodiment of the channelizer 104 will be described in more detail in relation to FIG. 3.

The SM & SC module 106 receives the primary channelized digital signals $116_0$ to $116_{M-1}$ from the channelizer 104 and generates a plurality of intermediate signals 120. The intermediate signals 120 are generated so that when they are combined by the synthesizers 108 they will produce real digital output signals 122 centered at predetermined intermediate frequencies and comprised of predetermined sets of the primary channelized digital signals $116_0$ to $116_{M-1}$. Since the secondary channelized digital signals $116_M$ and $116_{M-1}$ to $116_M$ are the images of the primary channelized digital signals $116_0$ to $116_{M-1}$ respectively, the SM & SC module 106 can obtain all of the necessary information to generate the intermediate signals 120 from only the primary channelized digital signals $116_0$ to $116_{M-1}$.

Typically the number of intermediate signals 120 generated by the SM & SC module 106 is based on the number of analog output signals 124 generated by the transponder 100 and the number of channels or frequency bands of each of the analog output signals 124. Specifically, the SM & SC module 106 generates $2N_i$ intermediate signals $120(i)_0$ to $120(i)_{Ni-1}$ for each of the analog output signals 124 where is the number of channels or frequency bands of the $i^{th}$ analog output signal $124_i$.

The $2N_i$ intermediate signals can be divided into two groups, the first $N_i$ intermediate signals $120(i)_0$ to $120(i)_{Ni-1}$ can be described as the primary intermediate signals and the last $N_i$ intermediate signals $120(i)_{Ni}$ to $120(i)_{2Ni-1}$ can be described as the secondary intermediate signals. Typically the primary intermediate signals $120(i)_0$ to $120(i)_{Ni-1}$ are equal to one of the primary channelized digital signals $116_0$ to $116_{M-1}$, and the secondary intermediate signals $120(i)_{Ni}$ and $120(i)_{2Ni-1}$ to $120(i)_{Ni+1}$ are the images of the primary intermediate signals respectively. For the purposes of this paper, an image signal is understood to be a signal that has the same amplitude, but is anti-phase or 180 degrees offset from the primary signal.

For example, say $N_1$ is equal to 2, the SM & SC module 106 will generate 4 intermediate signals 120, the first intermediate signal will typically be equal to one of the primary channelized digital signals, this will be referred to as signal A. The second intermediate signal will typically be equal to a second primary channelized digital signal, this will be referred to as signal B. The third intermediate signal will be the image of signal B, and the fourth intermediate signal will be the image of signal A.

It is not necessary, however, that all of the primary intermediate signals $120(i)_0$ to $120(i)_{Ni-1}$ be equal to one of the primary channelized digital signals $116_0$ to $116_{M-1}$. Accordingly, in some embodiments, one or more of the primary intermediate signals $120(i)_0$ to $120(i)_{Ni-1}$ may be replaced with a NIL or NULL channel. The NIL or NULL channels are locally generated channels containing either zeros or noise like signals of very low amplitude. The NIL or NULL channels may be used, for example, to implement frequency domain filtering for a particular digital output signal 122.

When a synthesizer 108 receives input signals in this format—the primary signals and their images on opposite ports—the synthesizer 108 will produce an output signal in real format. Where the synthesizer receives only the primary signals the synthesizer will produce an output signal in complex format.

The SM & SC module 106 may also receive a digital control signal 118. The digital control signal 118 may indicate which of the primary channelized digital signals $116_0$ to $116_{M-1}$ are to be included in each digital output signal 122, how many NIL channels are to be included in each digital output signal, and the order of the desired primary channelized digital signals $116_0$ to $116_{M-1}$ and any NIL channels. The digital control signal 118 may also indicate the desired intermediate frequency (IF) of each of the digital output signals 122. The digital control signal 118 may be a serial command signal that conforms to known standards, or any other format, compatible with the SM & SC module 106.

An exemplary embodiment of the SM & SC module 106 will be described in more detail in relation to FIG. 4.

For ease of explanation, the operation of the synthesizers 108 will be described generally in relation to the $i^{th}$ synthesizer $108_i$ where the $i^{th}$ synthesizer $108_i$ is associated with the $i^{th}$ analog output signal $124_i$. The $i^{th}$ synthesizer $108_i$ receives $2N_i$ intermediate signals $120(i)_0$ to $120(i)_{2Ni-1}$ from the SM & SC module 106 where $N_i$ is the number of channels in the $i^{th}$ digital output signal $122_i$. The $i^{th}$ synthesizer $108_i$ then combines or synthesizes the $2N_i$ intermediate signals 120 to produce the $i^{th}$ digital output signal $122_i$. Since each digital output signal 122 may have a different number of channels, each synthesizer 108 may receive a different number of intermediate signals 120 from the SM & SC module 106. Ideally, the digital output signal 122 produced by each synthesizer 108 is at the desired intermediate frequency (IF) and contains the desired channels in the desired order.

As described above, where the inputs to the $i^{th}$ synthesizer $108_i$ (intermediate signals $120(i)_0$ to $120(i)_{2Ni-1}$) are conjugate symmetric, the $i^{th}$ digital output signal $122_i$ will be a real signal. When this is the case the synthesizer 108 acts as both channel multiplexer and digital I/Q modulator. This provides a significant advantage over known synthesizers which typically produce an output signal in complex form, meaning that they produce both the in-phase and quadrature components of the output signal separately. Such a system then requires two digital to analog converters (DACs) to convert each of the digital signals (the in-phase and quadrature signals) to analog signals and a quadrature modulator to combine the analog in-phase and quadrature signals to produce a real analog signal. In addition, the output signals of such synthesizers are typically at baseband, not an intermediate frequency and so the system also typically includes a local oscillator for each output signal which is used in combination with the quadrature modulator to up-convert the output signal to the desired intermediate frequency.

In contrast to typical synthesizers, the output of each synthesizer 108 is real, thus a single DAC 110 is sufficient to convert the digital output signal 122 to an analog output signal 124. In this embodiment there is no need for the second DAC, the quadrature modulator and the local oscillator of the system described in the previous paragraph. The elimination of the second DAC, the quadrature modulator and the local oscillator results in a reduction of the power consumption and complexity of the transponder 100. Since the second DAC, the quadrature modulator and the local oscillator are eliminated for each digital output signal 122, the more output signals, the higher the reduction in power consumption. In some cases the transponder 100 configuration as shown in FIG. 1 can result in a 50% reduction in power over the system described in the previous paragraph.

In some embodiments the synthesizer 108 is implemented as a polyphase IFFT synthesizer. In these embodiments, the number of points of the IFFT processor required to produce a real output signal is doubled over the case where there is a complex output. For example, a 2N-point FFT processor is required to produce an N-channel output in real format, whereas only an N-point FFT processor is required to produce an N-channel output in complex format.

However, the benefits obtained from producing a real output signal far outweigh the drawbacks of using an IFFT processor with a higher number of points. An exemplary embodiment of a synthesizer 108 of FIG. 1 will be described in relation to FIG. 5.

Figure 3:
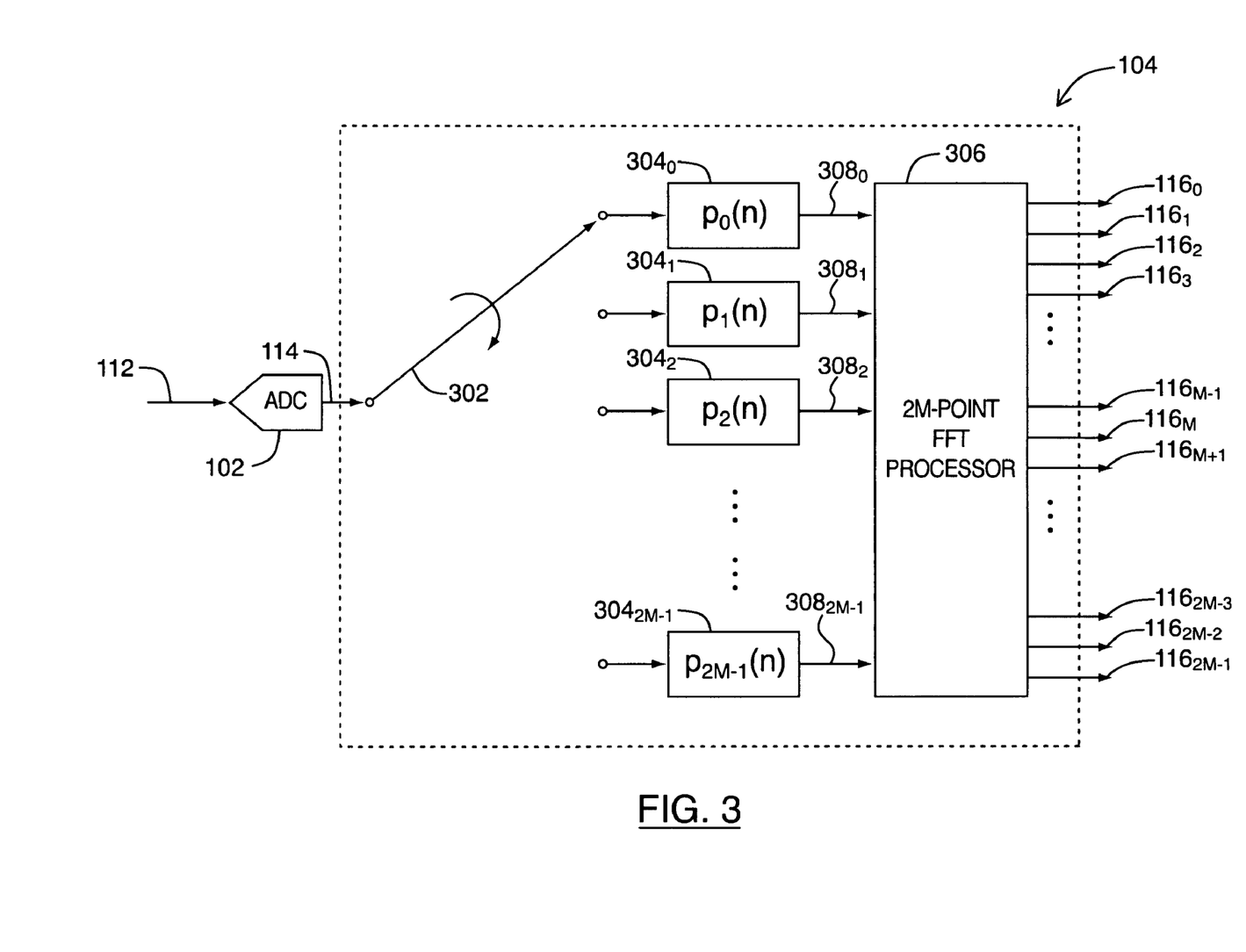
FIG. 3 is a block diagram of the channelizer of FIG. 1 in accordance with at least one embodiment.

Reference is now made to FIG. 3, in which an exemplary embodiment of the channelizer 104 of FIG. 1 is illustrated. As described above, the channelizer 104 receives a real digital wideband multi-carrier signal 114 and channelizes the signal into 2M channelized digital signals $116_0$ to $116_{2M-1}$ where M is the number of frequency bands in the real analog wideband multi-carrier signal 112. In the embodiment shown in FIG. 3, the channelizer 104 is implemented as a 2M path polyphase FFT filter bank analyzer or channelizer.

The channelizer or analyzer 104 includes a 2M pole commutator 302, 2M polyphase filters $304_0$ to $304_{2M-1}$ and a 2M-point FFT processor 306. As described above, a typical polyphase FFT filter bank channelizer includes only M polyphase filters and an M-point FFT processor. The pole commutator 302 receives the real digital wideband multi-carrier signal 114 from the ADC 102 and distributes samples of the real digital wideband multi-carrier signal 114 to the polyphase filters $304_0$ to $304_{2M-1}$ in a sequential manner. Since there are 2M filters, each filter $304_0$ to $304_{2M-1}$ is updated once every 2M samples.

The exact characteristics of the polyphase filters $304_0$ to $304_{2M-1}$, in terms of the pass band, transition band and stop band characteristics, are dependent upon the actual transponder 100 application and are typically defined by the user. Background on polyphase DSP can be found in R. E. Crochiere and L. E. Rabiner, Multirate Digital Signal Processing, Prentice Hall, Englewood Cliffs, N.J., 1983; and N.J. Fiege, Multirate Digital Signal Processing, John Wiley & Sons, 1994; the entire contents of which are herein incorporated by reference.

The polyphase filter outputs $308_0$ to $308_{2M-1}$ are fed to the FFT processor 306. The FFT processor 306 computes the 2M-point Fast Fourier Transform (FFT) of the polyphase filter outputs $308_0$ to $308_{2M-1}$ at a rate of $f_s/2M$ and outputs 2M channelized digital signals $116_0$ to $116_{2M-1}$. The 2M channelized digital signals $116_0$ to $116_{2M-1}$ can be divided into two groups, the primary channelized digital signals $116_0$ to $116_{M-1}$ and the secondary channelized digital signals $116_M$ to $116_{2M-1}$. Each of the primary and secondary channelized digital signals $116_0$ to $116_{2M-1}$ correspond to one of the channels $202_0$ to $202_{M-1}$ and $204_0$ to $204_{M-1}$ of the real digital wideband multi-carrier signal 114. Specifically, the primary channelized digital signals $116_0$ to $116_{M-1}$ correspond to the first block of channels $202_0$ to $202_{M-1}$ of the digital wideband multi-carrier signal 114 and the secondary channelized digital signals $116_M$ to $116_{2M-1}$ correspond to the second block of channels $204_0$ to $204_{M-1}$ of the digital wideband multi-carrier signal 114, respectively. As noted above, channels $204_0$ to $204_{M-1}$ are the images of channels $202_0$ to $202_{M-1}$ thus, the secondary channelized digital signals $116_M$ and $116_{2M-1}$ to $116_{M+1}$ are the images of the primary channelized digital signals $116_0$ to $116_{M-1}$, respectively. In one embodiment channel $202_0$ is used as a guard band channel, and channels $202_1$ to $202_{M-1}$ are used to transmit data and are often referred to as the data channels. Other embodiments, however, may have a different number and/or arrangement of guard band channels and data channels.

Figure 4:
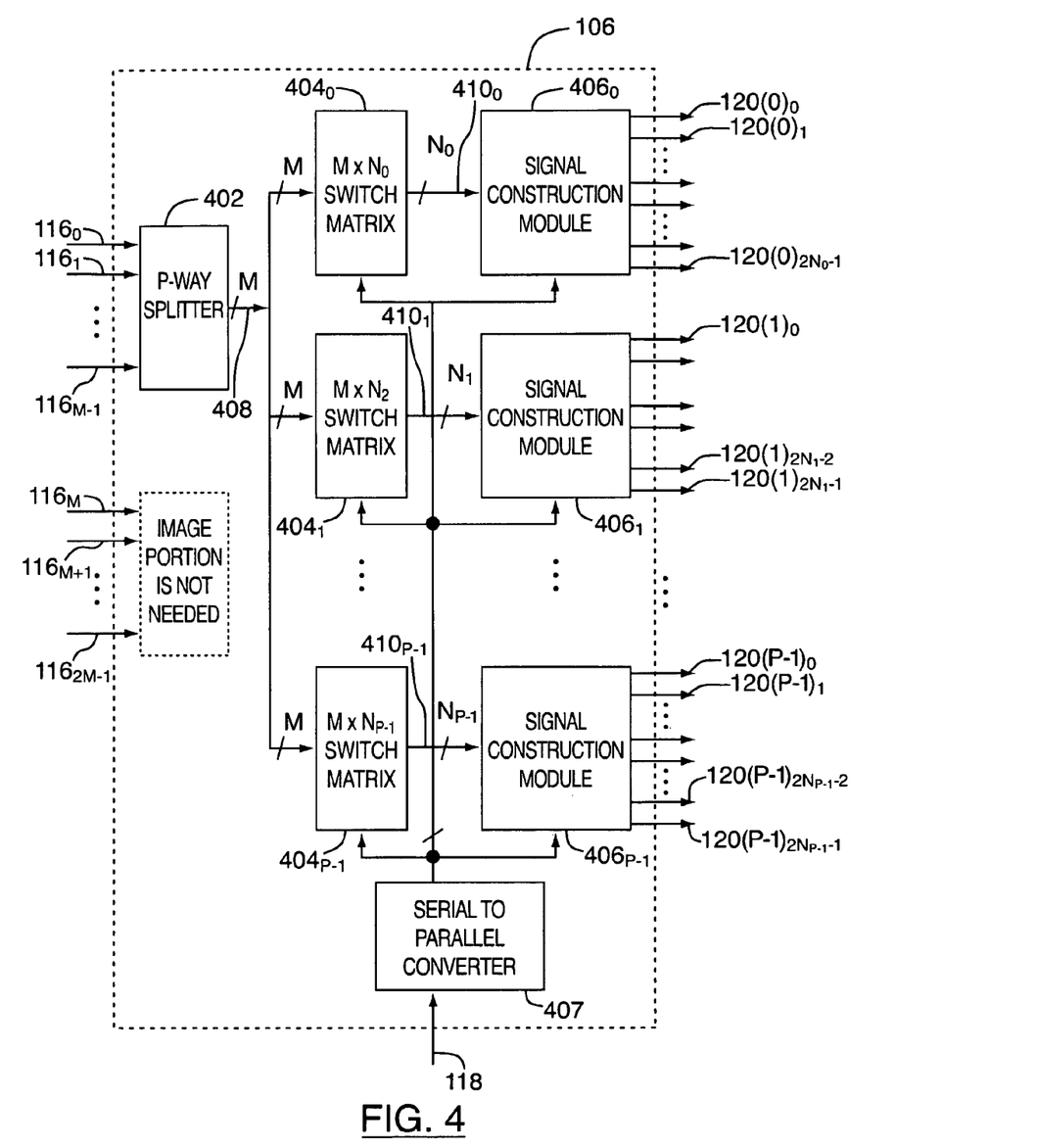
FIG. 4 is a block diagram of the switch matrix and signal construction (SM & SC) module of FIG. 1 in accordance with at least one embodiment.

Reference is now made to FIG. 4, in which an exemplary embodiment of the SM & SC module 106 of FIG. 1 is illustrated. As described above, the SM & SC module 106 receives the primary channelized digital signals $116_0$ to $116_{M-1}$ generated by the channelizer 104 and generates a plurality of intermediate signals 120 that when combined or synthesized by the synthesizers 108 produce one or more digital output signals 122. Ideally, each digital output signal 122 is at a predetermined intermediate frequency and includes a predetermined set of the channels of the real analog wideband multi-carrier signal 112.

In the embodiment shown in FIG. 4, the SM & SC module 106 includes a splitter 402, one or more switch matrices 404 and one or more signal construction modules 406. There is typically one switch matrix 404 and one signal construction module 406 for each analog output signal 124 produced by the transponder 100. While the embodiment shown in FIG. 4 has more than one switch matrix 404 and more than one signal construction module 406, where the transponder 100 only produces one analog output signal 124 the SM & SC module 106 may only have a single switch matrix 404 and a single construction module 406. The SM & SC module 106 may also include a serial to parallel converter 407 for receiving a digital control signal 118 and re-distributing the digital control signal 118 to the switch matrices 404 and signal construction modules 406.

The splitter 402 is a P-way splitter where P is the number of analog output signals 124 produced by the transponder 100. The splitter 402 receives the primary channelized digital signals $116_0$ to $116_{M-1}$ from the channelizer 104 and splits or duplicates the primary channelized digital signals $116_0$ to $116_{M-1}$ P times to produce P split groups 408. Each split group 408 includes all the primary channelized digital signals $116_0$ to $116_{M-1}$. One split group 408 is sent to each switch matrix 404.

For ease of explanation, the operation of the switch matrices 404 will be explained with reference generally to the $i^{th}$ switch matrix $404_i$ where the $i^{th}$ switch matrix $404_i$ is associated with the $i^{th}$ analog output signal $124_i$. The $i^{th}$ switch matrix $404_i$ is an M×$N_i$ switch matrix where M is the number of channels or frequency bands in the analog wideband multi-carrier signal 112 and $N_i$ is the number of channels or bands in the $i^{th}$ analog output signal $124_i$. Since the analog output signals $124_0$ to $124_{P-1}$ do not necessarily have the same number of channels or frequency bands (R), the switch matrices 404 may vary in size. As described above, both M and $N_i$ are integers greater than or equal to 1.

The $i^{th}$ switch matrix $404_i$ receives a split group 408 including the primary channelized digital signals $116_0$ to $116_{M-1}$ produced by the channelizer 104. The $i^{th}$ switch matrix $404_i$ then routes one or more of the primary channelized digital signals $116_0$ to $116_{M-1}$ to a switch matrix $404_i$ output port as a desired channel signal 410. In some embodiments, such as the embodiment shown in FIG. 4, the routing is based on information in the digital control signal 118. Specifically, the digital control signal 118 may specify which of the primary channelized digital signals $116_0$ to $116_{M-1}$ are to form part of which output signals 124 and in what order. Accordingly, in such embodiments each switch matrix 404 uses the information in the digital control signal 118 to select the desired primary channelized digital signals $116_0$ to $116_{M-1}$ from the split group 408 and to output them in the desired order as desired channel signals 410. In other embodiments the routing information is pre-configured into the switch matrix 404.

To more clearly explain the operation of the switch matrices 404 an exemplary scenario will be described. In this scenario there are two switch matrices $404_0$ and $404_1$—a first switch matrix $404_0$ and a second switch matrix $404_1$—and each switch matrix $404_0$ and $404_1$ receives five primary channelized digital signals 116: channel A, channel B, channel C, channel D and channel E respectively. The first switch matrix $404_0$ is notified via the digital control signal 118 that the first digital output signal $122_0$ is to contain channels A, C and D. Accordingly, the first switch matrix outputs channel A on port 1, channel C on port 2 and channel D on port 3. The second switch matrix $404_1$ is told via the digital control signal 118 that the second digital output signal $122_1$ is to contain channels C, A, E and B. Accordingly, the second switch matrix outputs channel C on port 1, channel A on port 2, channel E on port 3 and channel B on port 4. As can be seen from this scenario, not only does the switch matrix select the desired channelized digital signals from the split group 408, but the switch matrix arranges the desired channels into the desired order.

For ease of explanation, the operation of the signal construction modules 406 will be explained with reference generally to the $i^{th}$ signal construction module $406_i$ where the $i^{th}$ signal construction module $406_i$ is associated with the $i^{th}$ analog output signal $124_i$. The purpose of the $i^{th}$ signal construction module $406_i$ is to generate $2N_i$ intermediate signals $120(i)_0$ to $120(i)_{2Ni-1}$ from the received desired channel signals 410, that will produce a real digital output signal $122_i$ at a desired intermediate frequency when combined or synthesized by the $i^{th}$ synthesizer $108_i$.

As mentioned above, for the $i^{th}$ synthesizer $108_i$ to produce a digital output signal in real format as opposed to complex format, the synthesizer $108_i$ must receive, for each desired channelized digital signal, the channelized digital signal on a first port and the image of the channelized signal on a mirror port. Accordingly, the signal construction module 406 outputs each received desired channel signal 410 on the desired port as the primary intermediate signal, and generates the desired channel signal's 410 image from the primary intermediate signal, and outputs the image on the mirror port as the secondary intermediate signal.

To more clearly explain the operation of the signal construction modules 406 an exemplary scenario will be described. In this scenario there are two signal construction modules $406_0$ and $406_1$—a first signal construction module $406_0$ and a second signal construction module $406_1$. In this scenario the first and second signal construction modules $406_0$ and $406_1$ both have four input ports (0-3) and eight output ports (0-8). The first signal construction module $406_0$ receives three desired channel signals 410 from the corresponding first switch matrix $404_0$—channels A, C, E—on ports 1, 2 and 3 respectively. The first signal construction module also receives a control signal indicating that the desired intermediate frequency for the corresponding output signal is $2.0B_c$ where $B_c$ is the element channel bandwidth. The first signal construction module (i) generates a NIL channel for port 0, (ii) generates the images of the NIL channel and channels A, C and E, and (iii) outputs channels A, B and C and their images according to Table 2. By outputting the signals in this manner the corresponding sythesizer $108_0$ will produce a digital output signal $122_1$ with an intermediate frequency of $2.0B_c$ where $B_c$ is the element channel bandwidth.

TABLE 2

| Output Port | Signal |
|---|---|
| 0 | NIL |
| 1 | Channel A |
| 2 | Channel B |
| 3 | Channel C |
| 4 | NIL |
| 5 | Image of Channel C |
| 6 | Image of Channel B |
| 7 | Image of Channel A |

The NIL channels may be generated by the signal construction module 406 either in a pre-generated manner such as reading into registers containing value zero or pre-generated low level noise or the like, or by real time random sequence generators or the like.

Similarly, the second signal construction module $406_1$ receives two desired channel signals 410 from the corresponding second switch matrix $404_1$—channels B and A—on channels 1 and 2 respectively. The second signal construction module also receives a control signal indicating that the desired intermediate frequency for the corresponding output signal is $1.5B_c$ where $B_c$ is the element channel bandwidth.

The second signal construction module $406_1$ (i) generates NIL channels for ports 0 and 3, (ii) generates the images of the NIL channels and channels B and A, and (iii) outputs channels A, and B and their images according to Table 3. By outputting the signals in this manner the corresponding synthesizer $108_1$ will produce a digital output signal $122_1$ with an intermediate frequency of $1.5B_c$.

TABLE 3

| Output Port | Channel |
| --- | --- |
| 0 | NIL 1 |
| 1 | Channel B |
| 2 | Channel A |
| 3 | NIL 2 |
| 4 | Image of NIL 1 |
| 5 | Image of NIL 2 |
| 6 | Image of Channel A |
| 7 | Image of Channel B |

The operations (i) to (iii) performed by the signal construction modules $406_0$ and $406_1$ may be performed simultaneously or sequentially.

Figure 5:
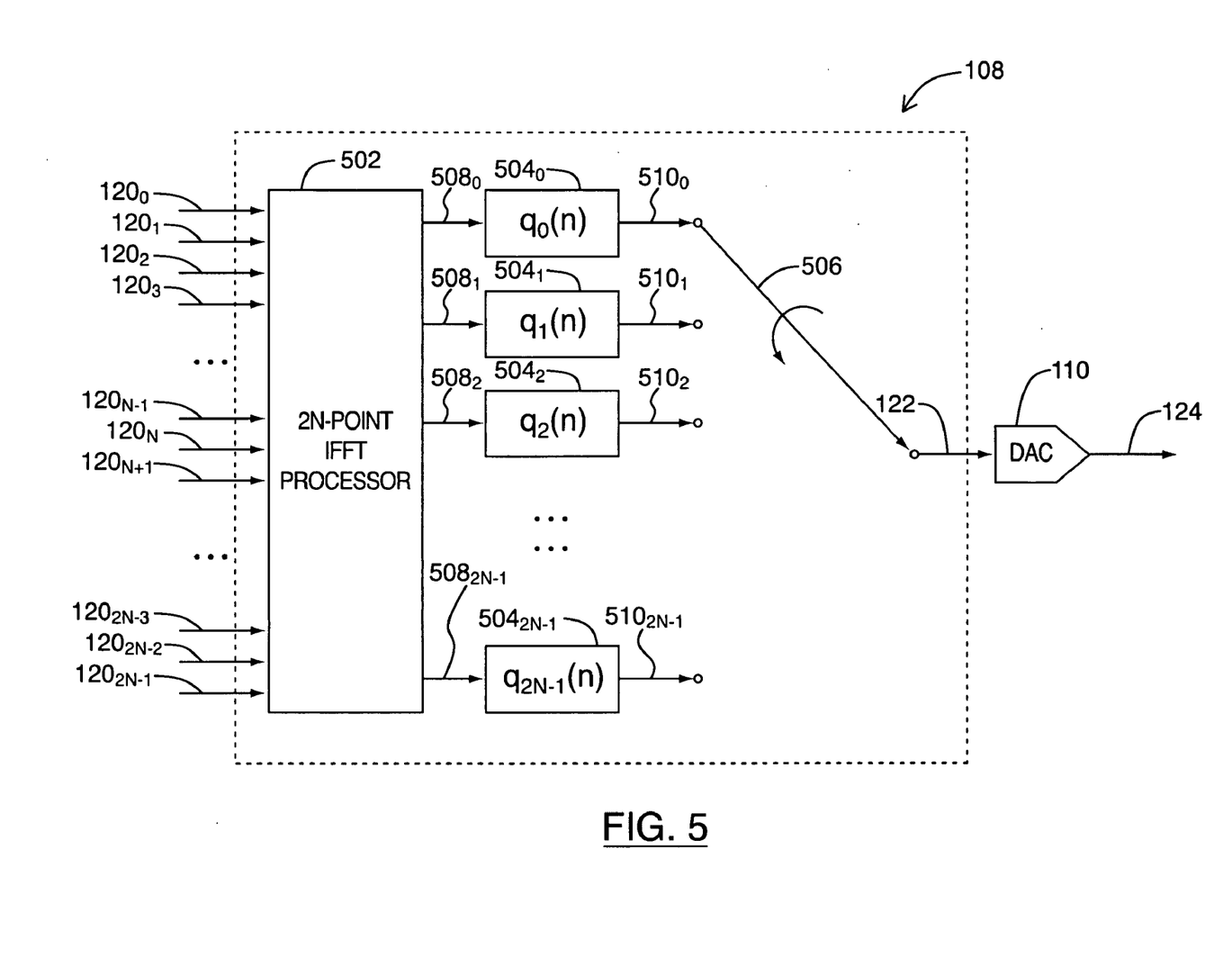
FIG. 5 is a block diagram of the synthesizer of FIG. 1 in accordance with at least one embodiment.

Reference is now made to FIG. 5, in which an exemplary embodiment of a synthesizer 108 of FIG. 1 is illustrated. As described above, the synthesizer 108 receives 2N intermediate signals 120 from the SM & SC module 106 where N is the number of channels in the digital output signal 122. As described above, the number of channels or frequency bands in the output signal 122, N, may be the same as or different than the number of channels in the analog wideband multi-carrier signal 112. Also, as noted above, each synthesizer 108 may have a different value of N. The synthesizer or combiner 108 synthesizes or combines the 2N intermediate signals 120 to produce a real digital output signal 122 at a desired intermediate frequency and containing the desired channels in the desired order.

In the embodiment shown in FIG. 5 the synthesizer 108 is implemented as a 2N path polyphase IFFT filter synthesizer or combiner. In this embodiment the synthesizer 108 includes a 2N-point IFFT processor 502, 2N polyphase filters $504_0$ to $504_{2N-1}$ and a 2N pole commutator 506. The IFFT processor 502 receives 2N intermediate signals $120_0$ to $120_{2N-1}$ from the SM & SC module 106 and computes the 2N-point Inverse Fast Fourier Transform (IFFT) of the 2N signals $120_0$ to $120_{2N-1}$. Each of the 2N intermediate signals 120 correspond to a channel or band. The channels or bands corresponding to intermediate signals $120_N$ and $120_{2N-1}$ to $120_{N+1}$ are the images of channels or bands corresponding to intermediate signals $120_0$ to $120_{N-1}$ respectively. In one embodiment the channels corresponding to intermediate signals $120_0$ and $120_N$ are guard bands and the channels corresponding to intermediate signals $120_1$ to $120_{N-1}$ and $120_{N+1}$ to $120_{2N-1}$ are used to transmit information and may be referred to as data channels. Other embodiments have other numbers and configurations of guard bands and data channels. Not all of the channels, however, have to be used or occupied, unused channels can simply be padded with zeros (i.e., NIL channels).

The IFFT processor 502 output signals $508_0$ to $508_{2N-1}$ are fed to the polyphase filters $504_0$ to $504_{2N-1}$ respectively. The polyphase filters $504_0$ to $504_{2N-1}$ filter the received signals $508_0$ to $508_{2N-1}$ and output filtered signals $510_0$ to $510_{2N-1}$. The exact characteristics of the polyphase filters $504_0$ to $504_{2N-1}$ in terms of the pass band, transition band and stop band characteristics are dependent upon the actual transponder 100 application and are typically defined by the user. Background on polyphase DSP can be found in R. E. Crochiere and L. E. Rabiner, *Multirate Digital Signal Processing*, Prentice Hall, Englewood Cliffs, N.J., 1983; and N.J. Fiege, *Multirate Digital Signal Processing*, John Wiley & Sons, 1994; the entire contents of which are herein incorporated by reference.

The pole commutator 506 samples each filtered signal $510_0$ to $510_{2N-1}$ sequentially to form a digital output signal 122. The digital output signal 122 will be centered at a desired intermediate frequency and will include the desired the channels of the analog wideband multi-carrier signal 112 in a desired order.

Figure 6A:
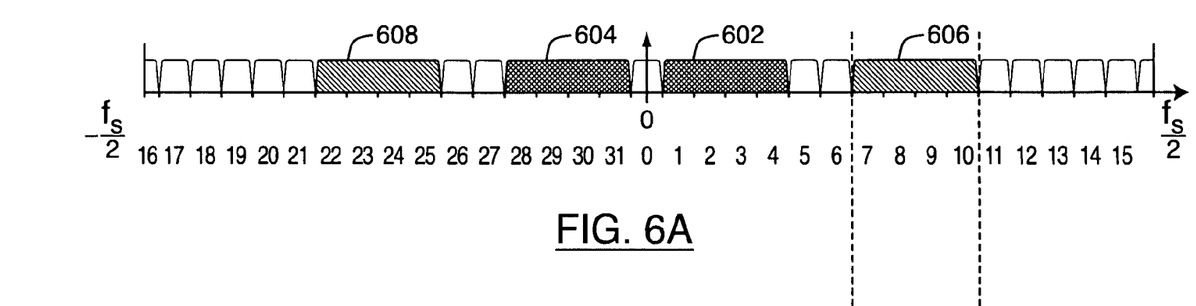
FIG. 6A is a graph illustrating the frequency characteristics of an exemplary input signal to the transponder of FIG. 1.
Figure 6B:
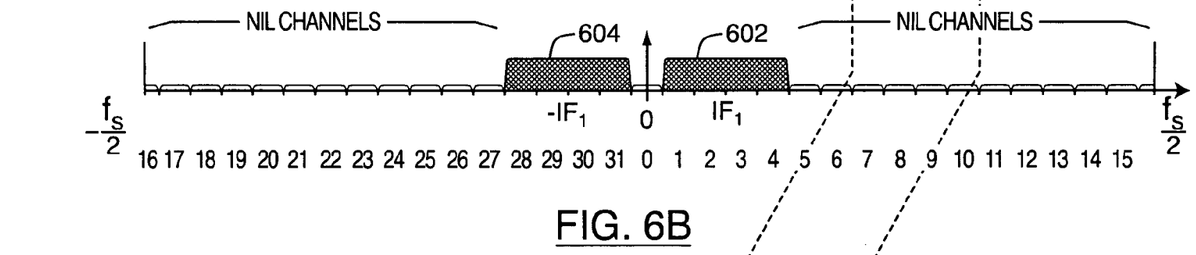
FIG. 6B is a graph illustrating the frequency characteristics of an exemplary first output signal of the transponder of FIG. 1 corresponding to the exemplary input signal of FIG. 6A.
Figure 6C:
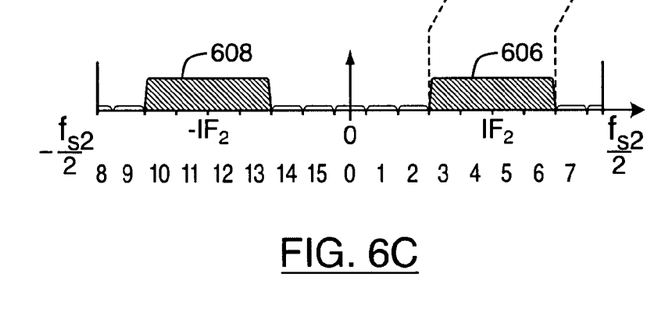
FIG. 6C is a graph illustrating the frequency characteristics of an exemplary second output signal of the transponder of FIG. 1 corresponding to the exemplary input signal of FIG. 6A.

Reference is now made to FIGS. 6A to 6C to illustrate the operation of the transponder 100 by way of an example. In this example, the transponder 100 receives an input signal as shown in FIG. 6A and produces two output signals as shown in FIGS. 6B and 6C.

FIG. 6A illustrates the frequency characteristics of an exemplary real analog wideband multi-carrier signal 112. As shown in FIG. 6A the exemplary real analog wideband multi-carrier signal 112 is comprised of sixteen unique element channels (channels 0 to 15) of equal bandwidth, $B_c$. Element channels 31 to 17 are the images of element channels 1 to 15 respectively and element channel 16 is the image of element channel 0. In the example shown in FIG. 6A, the element channels (1-31) form four wideband channels of interest. Element channels 1 to 4 form a first wideband channel of interest 602, and element channels 7 to 10 form a second wideband channel of interest 606. The third and fourth wideband channels of interest 604 and 608 formed by element channels 28 to 31 and 22 to 25 respectively, are the images of the first and second wideband channels of interest 602 and 606 respectively.

The ADC 112 of transponder 100 receives the real analog wideband multi-carrier signal 112 and converts the real analog wideband multi-carrier signal 112 into a real digital wideband multi-carrier signal 114. The channelizer 104 receives the digital wideband multi-carrier signal 114 and extracts the thirty-two element channels (0 to 31) and outputs them as channelized digital signals $116_0$ to $116_{31}$ respectively. Channelized digital signals $116_1$ to $116_4$ correspond to the first wideband channel of interest 602, channelized digital signals $116_7$ to $116_{10}$ correspond to the second wideband channel of interest 606, channelized digital signals $116_{28}$ to $116_{31}$ correspond to the third wideband channel of interest 608, and channelized digital signals $116_{22}$ to $116_{25}$ correspond to the fourth wideband channel of interest 604.

The primary channelized digital signals $116_0$ to $116_{15}$ are then sent to the SM & SC module 106. The splitter 402 of the SM & SC module 106 receives the primary channelized digital signals $116_0$ and $116_{15}$ and sends a copy of the primary channelized digital signals $116_0$ and $116_{15}$ to first and second switch matrices $404_0$ and $404_1$. The first switch matrix $404_0$ also receives a control signal that instructs it to send the channels $116_1$ to $116_4$ to the corresponding signal construction module $406_0$. The first switch module $404_0$ then selects the channelized digital signals $116_1$ to $116_4$ and sends them to the corresponding signal construction module $406_0$ as desired signals $410_0$. The second switch matrix $404_1$ also receives a control signal that instructs it to send the channelized signals $116_7$ to $116_{10}$ to the corresponding signal construction module $406_1$. The second switch matrix $404_1$ then selects the channelized digital signals $116_7$ to $116_{10}$ and sends them to the corresponding signal construction module $406_1$ as desired signals $410_1$.

The first signal construction module $406_0$ also receives a control signal indicating that the first output signal is to be at an intermediate frequency $IF_1$. The first signal construction module $406_0$ takes the channelized digital signals $116_1$ to $116_4$ and outputs them as the intermediate signals $120(0)_1$ to $120(0)_4$ corresponding to $IF_1$. The signal construction module also generates images of the channelized digital signals $116_1$ to $116_4$ and outputs them as the intermediate signals $120(0)_{28}$ to $120(0)_{31}$ corresponding to $IF_1$. The remaining intermediate signals $120(0)_0$, and $120(0)_5$ to $120(0)_{27}$ are filled with NIL channels.

The second signal construction module $406_1$ also receives a control signal indicating that the second output signal is to be at an intermediate frequency $IF_2$. The second signal construction module $406_1$ then takes the channelized digital signals $116_7$ to $116_{10}$ and outputs them as the intermediate signals $120(1)_3$ to $120(1)_6$ corresponding to $IF_2$. The second signal construction module $406_1$ also generates images of the channelized digital signals $116_7$ to $116_{10}$ and outputs them as the intermediate signals $120(1)_3$ to $120(1)_6$ corresponding to $IF_2$. The remainder of the intermediate signals $120(1)_0$ to $120(1)_2$, $120(1)_7$ to $120(1)_9$ and $120(1)_{14}$ to $120(1)_{15}$ are filled with NIL channels. Note that in this example the second signal construction module $406_1$ only generates 16 intermediate signals $120(1)_0$ to $120(1)_{15}$ whereas the first signal construction module $406_0$ generates 32 intermediate signals $120(0)_0$ to $120(0)_{31}$. This allows the second synthesizer $108_1$ to operate at a lower sampling rate than the first synthesizer $108_0$. This illustrates the flexibility of the sampling scheme.

The first synthesizer $108_0$ receives the intermediate signals $120(0)_0$ to $120(0)_{31}$ produced by the first signal construction module $406_0$ and combines them to produce a first real digital output signal $122_0$ with the characteristics shown in FIG. 6B. Specifically, a real signal at an intermediate frequency of $IF_1$ containing the first and third wideband channels of interest 602 and 604 of the input signal. The first DAC $110_0$ then converts the first digital output signal $122_0$ to a first analog output signal $124_0$.

The second synthesizer $108_1$ receives the intermediate signals $120(1)_0$ to $120(1)_{15}$ produced by the second signal construction module $406_1$ and combines them to produce a second real digital output signal $122_1$ with the characteristics shown in FIG. 6C. Specifically, a real signal with an intermediate frequency of $IF_2$ containing the second and fourth wideband channels of interest 606 and 608 of the input signal. The second DAC $110_1$ then converts the second real digital output signal $122_1$ to a second analog output signal $124_1$.

Figure 7:
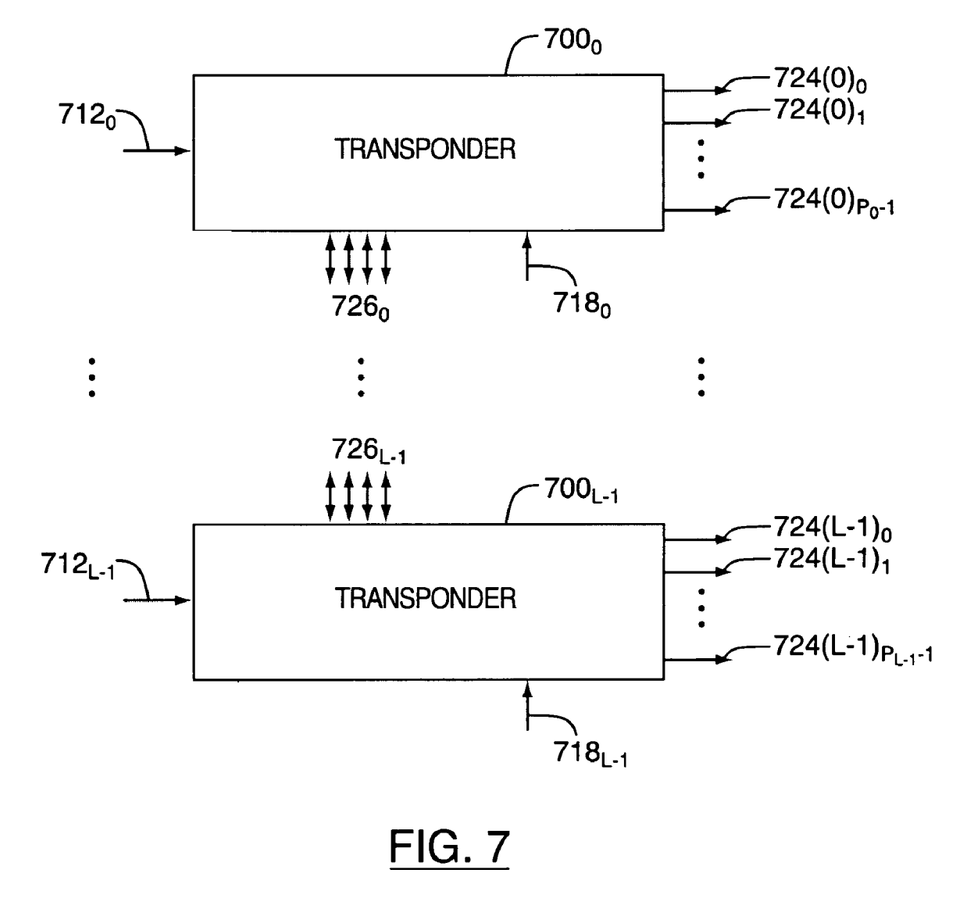
FIG. 7 is a block diagram of a transponder system comprising multiple interconnected transponders in accordance with at least one embodiment.

In some embodiments, several transponders 100 may work in conjunction to produce output signals that are a combination of the channels of a plurality of input signals. Reference is now made to FIG. 7, in which a transponder system 750 is illustrated. The transponder system 750 comprises L interconnected transponders $700_0$ to $700_{L-1}$ where L is an integer greater than or equal to two. The $i^{th}$ transponder $700_i$ receives a real analog wideband multi-carrier signal $712_i$ and generates $P_i$ analog output signals $724(i)_0$ to $724(i)_{Pi-1}$ in accordance with the operations described above. In addition to operating individually, the transponders may also have inter-link channels $726_0$ to $726_{L-1}$ to exchange selected primary channelized digital signals between transponders under command of the control signals $718_0$ to $718_{L-1}$.

Figure 8:
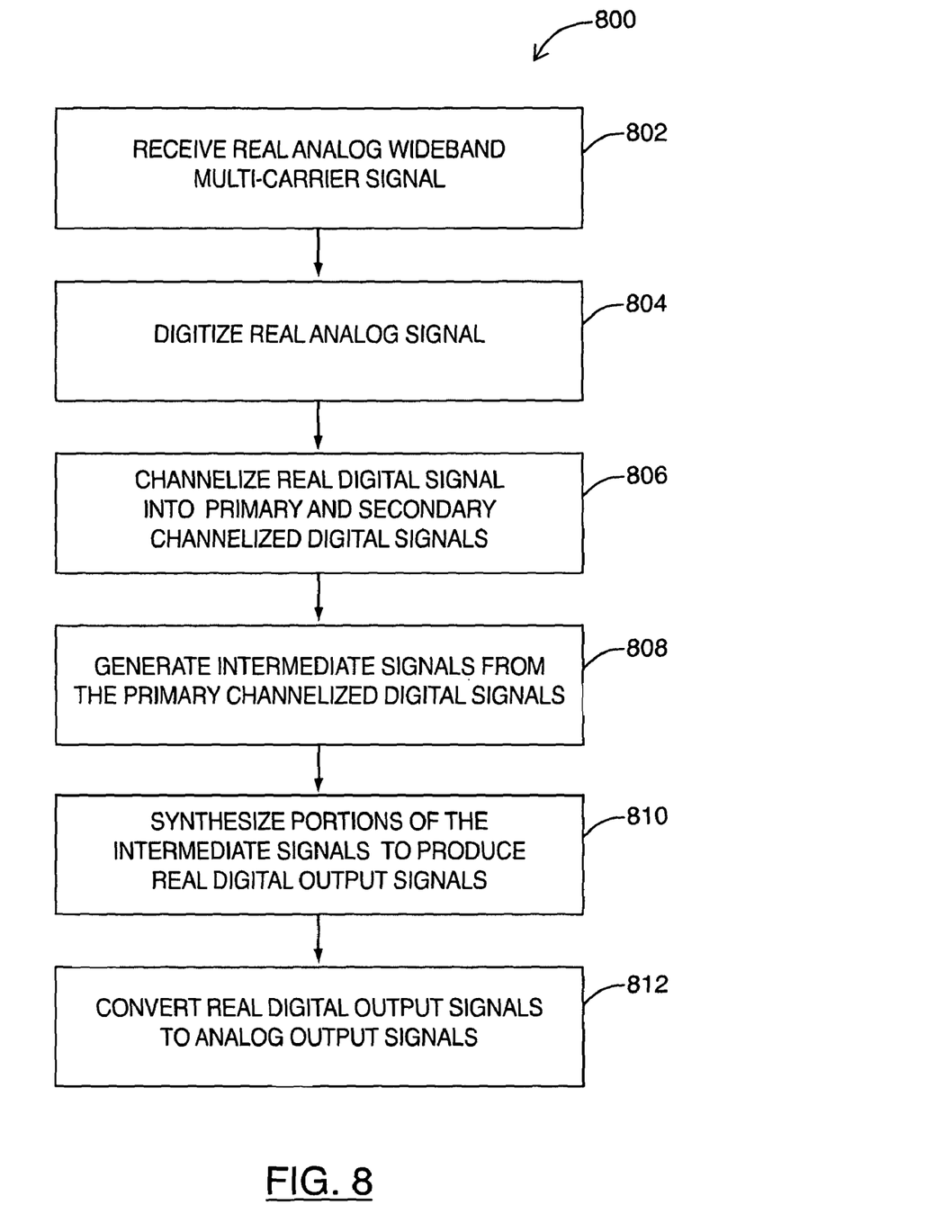
FIG. 8 is a flowchart of a method of converting at least one wideband multi-carrier signal into a plurality of wideband multi-carrier signals in accordance with at least one embodiment.

Reference is now made to FIG. 8, in which a method 800 of generating a plurality of output signals from one or more input signals where each output signal comprises a sub-set of the channels of the input signals in accordance with an embodiment is illustrated. While the method is applicable to generating multiple output signals from multiple input signals, for ease of explanation we will describe the single input signal situation.

At (802) a real analog wideband signals 112 comprising M frequency bands or channels where M is an integer greater than or equal to 1 is received. The analog signal 112 may be a version of a radio frequency (RF) signal received by an antenna that has been down converted to a low intermediate frequency (IF). Anti-aliasing filtering may also be performed on the analog signal 112 prior to being received at (802).

At (804) the real analog wideband multi-carrier signal 112 is digitized and output as a real digital wideband multi-carrier signal 114. The digitization may be performed by a device such as an analog to digital converter (ADC) 102. The ADC 102 may be any ADC suitable for digitization of a multi-carrier intermediate frequency (IF) signal.

The real digital wideband multi-carrier signal 114 has symmetric frequency domain characteristics. Specifically, the digital wideband multi-carrier signal 114 can be divided into 2M frequency bands or element channels $202_0$ to $202_{M-1}$ and $204_0$ to $204_{M-1}$ where element channels $204_0$ to $204_{M-1}$ are the images of channels $202_0$ to $202_{M-1}$. For example, if channel $202_1$ has a center frequency of $f_1$, then channel $204_1$ is the mirror image of channel $202_1$ centered at frequency $f_1$. Each channel $202_0$ to $202_{M-1}$ and $204_0$ to $204_{M-1}$ has the same bandwidth, $B_c$, referred to as the element channel bandwidth. The element channel bandwidth, $B_c$, is related to the ADC 102 sampling frequency, $f_s$, by the ratio $f_s/2M$.

At (806) the real digital wideband multi-carrier signal 114 is channelized into 2M channelized digital signals $116_0$ to $116_{2M-1}$. The channelized digital signals can be divided into two groups, the primary channelized digital signals $116_0$ to $116_{M-1}$ and the secondary channelized digital signals $116_M$ to $116_{2M-1}$. Each of the primary and secondary channelized digital signals $116_0$ to $116_{2M-1}$ correspond to one of the channels $202_0$ to $202_{M-1}$ and $204_0$ to $204_{M-1}$ of the real digital wideband multi-carrier signal 114. Specifically, the primary channelized digital signals $116_0$ to $116_{M-1}$ correspond to the first block of channels $202_0$ to $202_{M-1}$ of the digital wideband multi-carrier signal 114 and the secondary channelized digital signals $116_{2M-1}$ to $116_M$ correspond to the second block of channels $204_1$ to $204_{M-1}$ and $204_0$ of the digital wideband multi-carrier signal 114. As noted above, channels $204_0$ to $204_{M-1}$ are the images of channels $202_0$ to $202_{M-1}$ thus secondary channelized digital signals $116_M$ and $116_{2M-1}$ to $116_{M+1}$ are the images of channelized digital signals $116_0$ to $116_{M-1}$ respectively.

In one embodiment channel $202_0$, and thus channel $204_0$ is used as a guard band channel and channels $202_1$ to $202_{M-1}$ and $204_1$ to $204_{M-1}$ are used to transmit data and are often referred to as data channels. Other embodiments may have other numbers and configurations of guard bands and data channels. The channelization may be performed by a 2M-point polyphase FFT filter bank analyzer or channelizer as described above in reference to FIG. 3.

At (808) only the primary channelized digital signals $116_0$ to $116_{M-1}$ are used to generate a plurality of intermediate signals 120 that when combined or synthesized by one or more synthesizers (e.g. synthesizers 108) produce one or more digital output signals 122 that are centered at predetermined intermediate frequencies and are comprised of a predetermined combination of the primary channelized digital signals $116_0$ to $116_{M-1}$.

To more clearly explain generating the plurality of intermediate signals 120 from the channelized digital signals $116_0$ to $116_{M-1}$ an exemplary scenario will be described. In this scenario the real digital wideband multi-carrier signal 114 is comprised of two channels, channel A and channel B and the desired result is to output three signals where the first output signal is comprised of only channel A, the second output signal is comprised of only channel B, and the third output signal is comprised of both channel A and B, but the order is reversed.

Once the channels are separated by the channelization process, a plurality of intermediate signals 120 are generated to get the desired output signals. For example, to generate the first output signal a copy of channel A is generated and sent to a first synthesizer. To generate the second output signal a copy of channel B is sent to a second synthesizer. And finally, to generate the third output signal copies of channel A and B are sent to the synthesizer, but in the reverse order. However, to get a real output (as opposed to a complex output) from the synthesizers, the system must also generate the image to channels A and B and send them to the synthesizers on the mirror ports.

In some embodiments the channels associated with a particular output signal 122 and the order of the channels within the output signal 122 may be dictated by a digital control signal 118. The digital control signal 118 may also dictate the intermediate frequency of the output signal 122. The digital control signal 118 may be a serial command signal and the format of the signal only need be compatible with the SM & SC module 106. In other embodiments the channels associated with a particular output signal 122 and the order of the channels within the output signal 122 is preconfigured.

(808) may be performed by a switch matrix and signal construction module as described in reference to FIG. 4.

Returning to FIG. 8, at (810) portions of the intermediate signals 120 are combined or synthesized to form one or more real digital output signals 122. Each real digital output signal 122 is centered at a desired intermediate frequency and is comprised of at least some of the channels of the analog wideband multi-carrier signal 112. The combination may be performed by one or more 2N-point polyphase IFFT filter bank combiners or synthesizers as described above in reference to FIG. 5.

At (812) the one or more real digital output signals 122 are converted into real analog output signals 124. The conversion may be performed by one or more digital to analog converters (DACs) (e.g. DAC 110).

As described above with reference to signal 112, while the element frequency bands or channels of signal 122 (and by extension channelized digital signals 116 and the intermediate signals 120) can be designed to contain a single narrow signal, certain wideband signals may occupy multiple element frequency bands or channels (and by extension multiple channelized digital signals 116 and multiple intermediate signals 120). In such cases the wideband signals can be routed through the transponder 100 via multiple channelized digital signals 116 and multiple intermediate signals 120, such that the transponder 100 can serve as a bandwidth tunable filter for a wide range of signals with varying bandwidths.

The reduced power consumption of transponder 100 make it well suited for use in multi-beam satellite payloads or other multi-beam communication systems. However, transponder 100 may also be suitable for use in multi-channel digital transcievers in both the wireless and wireline industries.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A digital transponder comprising:
   (a) an analog to digital converter configured to receive a real analog wideband multi-carrier signal and generate a real digital wideband multi-carrier signal from the real analog wideband multi-carrier signal, the real analog wideband multi-carrier signal comprising M channels, M being an integer greater than or equal to one;
   (b) a channelizer configured to channelize the real digital wideband multi-carrier signal into 2M channelized digital signals, the 2M channelized digital signals comprising M pairs of channelized digital signals, each pair of channelized digital signals comprising a primary channelized digital signal and a secondary channelized digital signal, the secondary channelized digital signal being an image of the primary channelized digital signal;
   (c) a switch matrix and signal construction module configured to generate a plurality of intermediate signals from only the primary channelized digital signals, the plurality of intermediate signals comprising pairs of intermediate signals, each pair comprising a primary intermediate signal and a secondary intermediate signal, the secondary intermediate signal being an image of the primary intermediate signal;
   (d) at least one synthesizer, the at least one synthesizer configured to combine at least one pair of intermediate signals to generate a real digital output signal; and
   (e) at least one digital to analog converter, the at least one digital to analog converter configured to convert the real digital output signal to an analog output signal.

2. The digital transponder of claim 1, wherein each secondary intermediate signal is equal in amplitude and is anti-phase with the corresponding primary intermediate signal.

3. The digital transponder of claim 1, wherein the channelizer is a polyphase FFT filter bank channelizer.

4. The digital transponder of claim 3, wherein the channelizer is a 2M-point polyphase FFT filter bank channelizer.

5. The digital transponder of claim 1, wherein the at least one synthesizer is a polyphase IFFT filter bank synthesizer.

6. The digital transponder of claim 5, wherein
   the digital output signal comprises N channels, N being an integer greater than or equal to one; and
   the at least one synthesizer is a 2N-point polyphase IFFT filter bank synthesizer.

7. The digital transponder of claim 1, wherein the switch matrix and signal construction module comprises:
   at least one switch matrix configured to receive the primary channelized digital signals, select at least one primary channelized digital signal, and output the at least one selected signal as a desired channel signal; and
   at least one signal construction module configured to receive the desired channel signal and generate the plurality of intermediate signals based on the desired channel signal.

8. The digital transponder of claim 7, wherein
   the switch matrix and signal construction module further comprises a digital control signal; and
   the at least one switch matrix selects the at least one primary channelized signal based on the digital control signal.

9. The digital transponder of claim 8, wherein
   the real digital output signal comprises at least one of the M channels of the real digital wideband multi-carrier signal; and
   the digital control signal dictates the at least one of the M channels.

10. The digital transponder of claim 8, wherein
the analog output signal is at an intermediate frequency; and
the digital control signal dictates the intermediate frequency of the analog output signal.

11. The digital transponder of claim 7, wherein at least one pair of intermediate signals comprise NIL signals.

12. The digital transponder of claim 11, wherein the transponder is a bandwidth tunable filter.

13. A method of converting an input wideband multi-carrier signal into at least one analog output wideband multi-carrier signal, the method comprising:
(a) receiving the input wideband multi-carrier signal, the input wideband signal being a real analog signal and comprising M channels, M being an integer greater than or equal to one;
(b) digitizing the input wideband multi-carrier signal to produce a real digital input wideband multi-carrier signal;
(c) channelizing the real digital wideband multi-carrier signal into 2M separate channelized digital signals, the 2M channelized digital signals comprising M pairs of channelized digital signals, each pair of channelized digital signals comprising a primary channelized digital signal and a secondary channelized digital signal, the secondary channelized digital signal being an image of the primary channelized digital signal;
(d) generating a plurality of intermediate signals from only the primary channelized digital signals, the plurality of intermediate signals comprising pairs of intermediate signals, each pair comprising a primary intermediate signal and a secondary intermediate signal, the secondary intermediate signal being an image of the primary intermediate signal;
(e) synthesizing at least one pair of intermediate signals to generate at least one real digital output signal; and
(f) converting the at least one real digital output signal to the at least one real analog output signal.

14. The method of claim 13, wherein the channelization is performed by a polyphase FFT filter bank channelizer.

15. The method of claim 14, wherein the channelization is performed by a 2M-point polyphase FFT filter bank channelizer.

16. The method of claim 13, wherein the synthesization is performed by at least one polyphase IFFT filter bank synthesizer.

17. The method of claim 13, wherein the synthesization is performed by at least one 2N-point polyphase IFFT filter bank synthesizer where the at least one digital output signal comprises N channels and N is an integer greater than or equal to one.

18. The method of claim 13, wherein the secondary intermediate signal is equal in amplitude and anti-phase with the primary intermediate signal.

19. The method of claim 13, wherein the plurality of intermediate signals are generated in accordance with a digital control signal.

20. The method of claim 19, wherein:
the at least one analog output signal comprises at least one of the M channels; and
the digital control signal dictates which of the M channels the at least one analog output signals comprises.

21. The method of claim 19, wherein:
the at least one analog output signal is centered at an intermediate frequency; and
the digital control signal dictates the intermediate frequency of the at least one analog output signal.

22. A digital transponder system comprising:
a first transponder comprising:
a first analog to digital converter configured to receive a first real analog wideband multi-carrier signal and generate a first real digital wideband multi-carrier signal from the first real analog wideband multi-carrier signal, the real analog wideband multi-carrier signal comprising K channels, K being an integer greater than or equal to one; and
a first channelizer configured to channelize the first real digital wideband multi-carrier signal into 2K first channelized digital signals, the 2K first channelized digital signals comprising K pairs of first channelized digital signals, each pair of first channelized digital signals comprising a first primary channelized digital signal and a first secondary channelized digital signal, the first secondary channelized digital signal being an image of the first primary channelized digital signal; and
a second transponder interconnected with the first transponder so that the second transponder receives at least a portion of the first primary channelized signals, the second transponder comprising;
a second analog to digital converter configured to receive a second real analog wideband multi-carrier signal and generate a second real digital wideband multi-carrier signal from the second real analog wideband multi-carrier signal, the second real analog wideband multi-carrier signal comprising M channels, M being an integer greater than or equal to one;
a second channelizer configured to channelize the second real digital wideband multi-carrier signal into 2M second channelized digital signals, the 2M second channelized digital signals comprising M pairs of second channelized digital signals, each pair of second channelized digital signals comprising a second primary channelized digital signal and a second secondary channelized digital signal, the second secondary channelized digital signal being an image of the second primary channelized digital signal;
a switch matrix and signal construction module configured to generate a plurality of intermediate signals from only the portion of the first primary channelized digital signals and the second primary channelized digital signals, the plurality of intermediate signals comprising pairs of intermediate signals, each pair comprising a primary intermediate signal and a secondary intermediate signal, the secondary intermediate signal being an image of the primary intermediate signal;
at least one synthesizer, the at least one synthesizer configured to combine at least one pair of intermediate signals to generate a real digital output signal; and
at least one digital to analog converter, the at least one digital to analog converter configured to convert the real digital output signal to an analog output signal.

\* \* \* \* \*